C. A. CORNELL & S. E. McKEE.
CONCRETE PUMP.
APPLICATION FILED APR. 9, 1913.
1,093,916.
Patented Apr. 21, 1914.
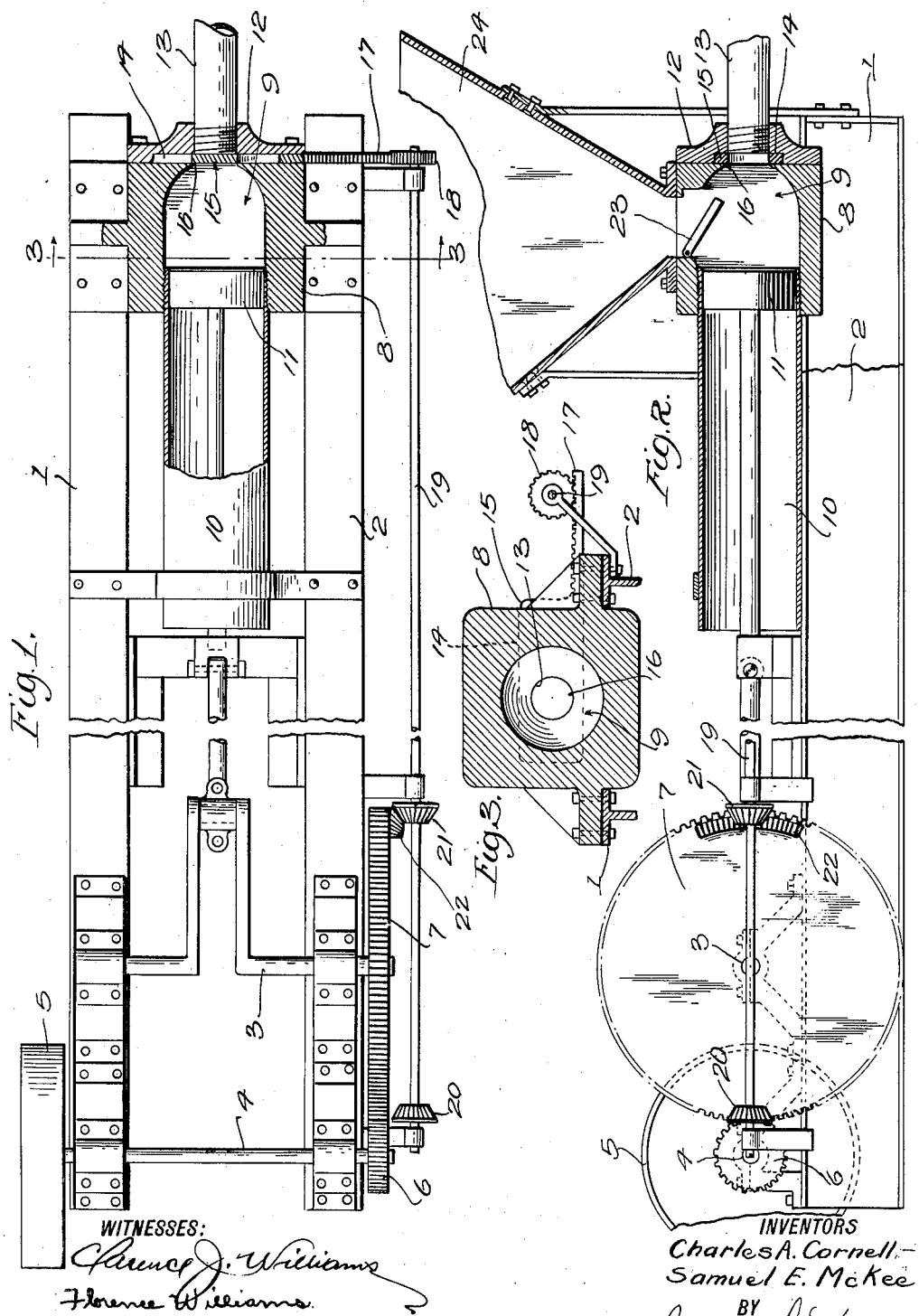
WITNESSES:
INVENTORS
Charles A. Cornell
Samuel E. McKee
BY
Semer G. Wells,
THEIR ATTORNEY

UNITED STATES PATENT OFFICE.

CHARLES A. CORNELL, OF HOLLYWOOD, AND SAMUEL E. McKEE, OF LOS ANGELES, CALIFORNIA.

CONCRETE-PUMP.

1,093,916.  Specification of Letters Patent.  Patented Apr. 21, 1914.

Application filed April 9, 1913. Serial No. 759,920.

*To all whom it may concern:*

Be it known that we, CHARLES A. CORNELL and SAMUEL E. McKEE, citizens of the United States, residing, respectively, at Hollywood, California, and Los Angeles, California, have invented a new and useful Concrete-Pump, of which the following is a specification.

Our object is to make an improved machine for pumping concrete, cement, plaster and the like; and my invention consists of the novel features herein shown, described and claimed.

In the drawings Figure 1 is a view looking downwardly, partly in plan and partly in section. Fig. 2 is a side view partly in elevation and partly in section. Fig. 3 is a vertical cross section on the line 3—3 of Fig. 1.

The I-beams 1 and 2 are mounted in parallel positions. The crank shaft 3 is mounted upon the I-beams near their rear ends. The driving shaft 4 is mounted behind the crank shaft 3, there being a driving pulley 5 upon one end, and a pinion 6 upon the other end meshes with a larger spur gear 7 upon the crank shaft 3. The pump head 8 is mounted upon the front ends of the I-beams and has an inverted T-shaped chamber 9. The pump cylinder 10 is connected to the rear end of the chamber 9, the pump piston 11 is mounted in the chamber 9 and connected to the crank shaft 3. The housing plate 12 is secured to the front face of the pump head 8, so as to form a connection for the delivery pipe 13 and so as to make the gate valve chamber 14. The gate valve 15 is mounted in the gate valve chamber 14 so as to open and close the passage 16 to the delivery pipe 13. A gear rack 17 extends from the gate valve 15 and meshes with the pinion 18 upon the counter shaft 19, said counter shaft extending diametrically across the outer face of the gear 7. The bevel pinions 20 and 21 are fixed upon the counter shaft 19, one on each side of the center of the gear 7. The bevel segment 22 is mounted upon the outer face of the gear 7 in position to mesh with the pinions 20 and 21, so as to open and close the gate valve. The wing valve 23 is mounted in the vertical passage of the chamber 9, so as to swing upwardly and close the passage and swing downwardly to open the passage. The hopper 24 is mounted upon the pump head 8 and discharges into the chamber 9. The material placed in the hopper will be drawn downwardly by the backward movement of the piston and forced through the delivery pipe by the forward movement.

We claim:

In a concrete pump, a pump head having a chamber leading forwardly and backwardly and upwardly, a pump cylinder connected to the back end of the chamber, a hopper connected to the upper end of the chamber, a wing valve controlling the passage from the hopper to the chamber, a delivery pipe connected to the forward end of the chamber, a gate valve controlling the passage to the delivery pipe, a gear rack upon the gate valve, a piston in the pump cylinder, a crank shaft for operating the piston, and a counter shaft connected to the gate valve rack and intermittently connected to the crank shaft.

CHARLES A. CORNELL.
SAMUEL E. McKEE.

Witnesses:
BERTHA McMASTER,
SEMER G. WELLS.